United States Patent
Li

(10) Patent No.: US 9,461,923 B2
(45) Date of Patent: Oct. 4, 2016

(54) PERFORMANCE-BASED ROUTING IN SOFTWARE-DEFINED NETWORK (SDN)

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 270 days.

(21) Appl. No.: 14/099,670

(22) Filed: Dec. 6, 2013

(65) Prior Publication Data

US 2015/0163152 A1   Jun. 11, 2015

(51) Int. Cl.
| | |
|---|---|
| *H04L 12/26* | (2006.01) |
| *H04L 12/851* | (2013.01) |
| *H04L 12/771* | (2013.01) |
| *H04L 12/24* | (2006.01) |
| *H04L 12/715* | (2013.01) |
| *H04L 12/721* | (2013.01) |

(52) U.S. Cl.
CPC ....... *H04L 47/2441* (2013.01); *H04L 41/5019* (2013.01); *H04L 43/08* (2013.01); *H04L 43/50* (2013.01); *H04L 45/123* (2013.01); *H04L 45/56* (2013.01); *H04L 43/0829* (2013.01); *H04L 43/0847* (2013.01); *H04L 43/0864* (2013.01); *H04L 43/0876* (2013.01); *H04L 43/0882* (2013.01); *H04L 43/0888* (2013.01); *H04L 45/64* (2013.01); *H04L 45/70* (2013.01)

(58) Field of Classification Search
CPC  H04L 47/2441; H04L 45/56; H04L 43/0876

USPC ........... 370/241–253, 389, 395.2, 395.21, 370/395.3, 395.31, 400, 409
See application file for complete search history.

(56) References Cited

U.S. PATENT DOCUMENTS

| | | | | |
|---|---|---|---|---|
| 2011/0026520 | A1* | 2/2011 | Zhou | H04L 45/00 370/389 |
| 2013/0107729 | A1* | 5/2013 | Wagner | H04L 43/0882 370/252 |
| 2013/0250770 | A1* | 9/2013 | Zou | H04L 47/19 370/238 |
| 2015/0163147 | A1* | 6/2015 | Li | H04L 47/18 370/236 |

FOREIGN PATENT DOCUMENTS

IN   WO 2015040624 A1 *   3/2015   ......... H04L 43/0829

* cited by examiner

*Primary Examiner* — Wei-Po Kao

(57) ABSTRACT

System and method for performance-based routing in an SDN. An SDN controller is configured to adaptively determine data transmission routes based on real-time route performance evaluation provided by a virtual router. The virtual router includes a route detection component to attain route performance data and a performance evaluation component to evaluate the route performance based on predetermined criteria provided by the SDN controller. The evaluation result is sent to the SDN controller and used to intelligently determine a superior route selection and route usage for a specific application program. According to the determination, the SDN controller updates the flow table associated with the virtual router for subsequent data transmission.

18 Claims, 5 Drawing Sheets

PERFORMANCE-BASED ROUTING IN SOFTWARE-DEFINED NETWORK (SDN)

TECHNICAL FIELD

The present disclosure relates generally to the field of communication network, and, more specifically, to the field of software-defined networks (SDN).

BACKGROUND

In a software-defined network (SDN) architecture, the control plane that implements important network routing and switching functionalities and the data forwarding plane are decoupled. The control plane can be logically centralized and implemented with a variety of hardware components of varied architectures. The data plane may utilize inexpensive and simplified network switches or routers configurable by a SDN controller as a result. The SDN paradigm has increasingly gained popularity in both research and commercial environments due to its scalability, cost-efficiency, reliability, and flexibility in customizing and optimizing network services to specific user needs.

Performance-based routing can improve real-time application performance and availability of a network by selecting an optimized path or load balancing for application data based upon path performance related to desired criteria. In traditional network, the routers or other hardware devices in respective network nodes can readily detect and provide the path performance data which can be used for performance evaluation.

However, due to the separation of the control plane and the data plane in a SDN, it is difficult for a SDN controller to acquire route performance related data and intelligently control the distribution of specific application data over the network in accordance with real-time route performance.

SUMMARY OF THE INVENTION

Therefore, it would be advantageous to provide a SDN routing mechanism that is based on real-time route or link performance of the network.

Provided herein are a system and method for performance-based routing in an SDN. An SDN controller is configured to adaptively determine data transmission routes based on real-time route performance evaluation provided by a virtual router. The virtual router includes a route detection component to collect route performance data and a performance evaluation component to evaluate the route performance based on predetermined criteria provided by the SDN controller. The evaluation result is sent to the SDN controller and used to intelligently determine a superior route selection and route usage for a specific application program. According to the determination, the SDN controller updates the flow table associated with the virtual router for subsequent data transmission. The route performance detection and/or evaluation module may be disposed in the SDN controller in some other embodiments.

In one embodiment of the present disclosure, a computer implemented method of routing data in a software-defined network (SDN) through a virtual network element comprises: (1) identifying a source node and a destination node in the SDN for transmitting packet data; (2) identifying evaluation criteria; (3) detecting performance data indicative of link performance between the source node and the destination node; (4) evaluating the performance data with reference to the evaluation criteria; (5) sending an evaluation result to an SDN controller of the SDN; and (6) receiving a flow table that is configured by the SDN controller based on the evaluation result.

The foregoing is a summary and thus contains, by necessity, simplifications, generalization and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1A:
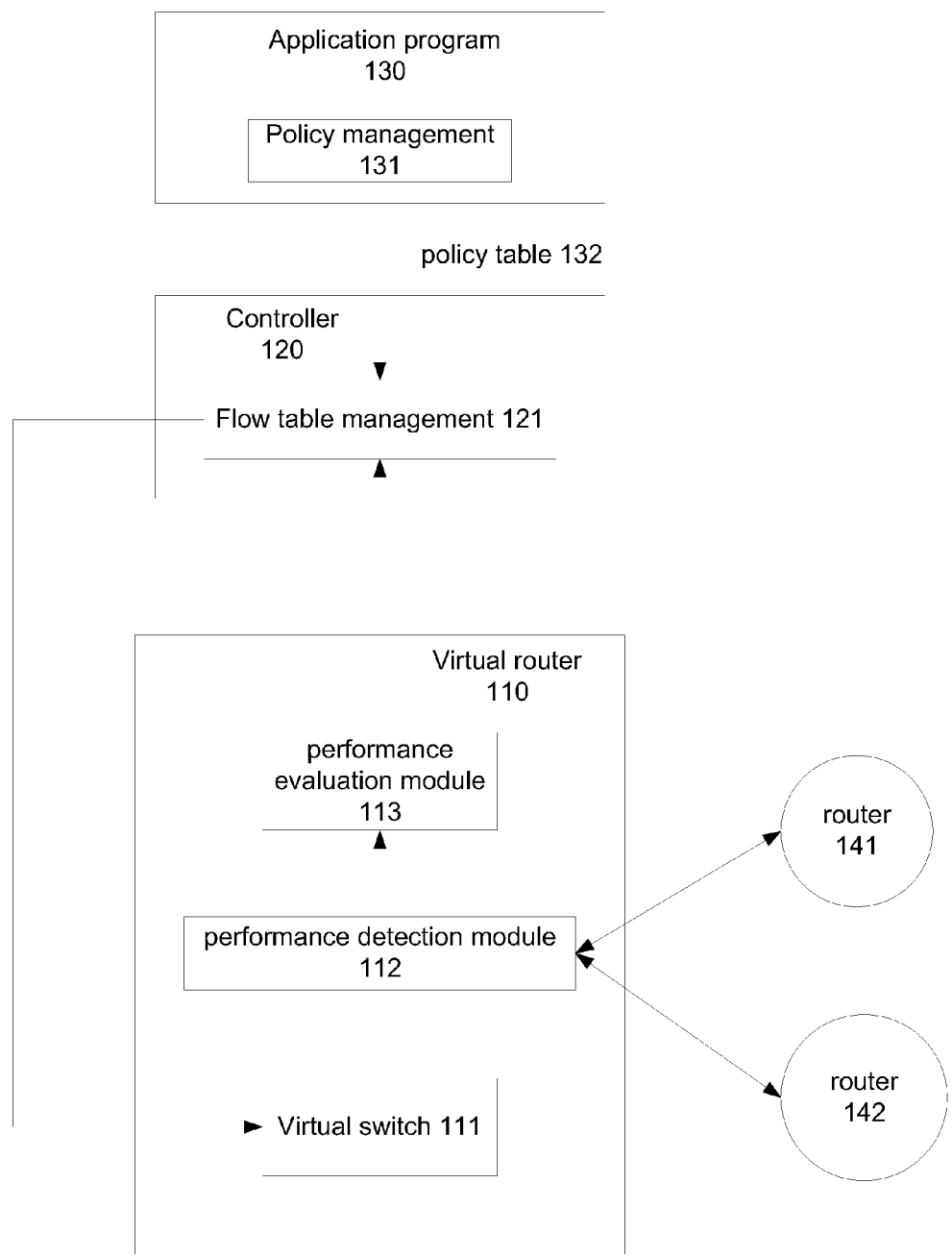
FIG. 1A is a functional block diagram depicting an exemplary configuration of a SDN virtual router capable of attaining route performance data and providing the evaluation result to an SDN controller in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps.

It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

NOTATION AND NOMENCLATURE

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Performance-Based Routing in Software-Defined Network (SDN)

Embodiments of the present disclosure employ a virtual network element in a software-defined network (SDN) to detect and evaluate real-time route (or link) performance and furnish the evaluation results to a SDN controller to adaptively determine data transmission paths. A virtual network element, accordingly to the present disclosure, includes a performance detection component and a performance evaluation component that are configured to detect route performance data and evaluate route performance with reference to a set of criteria specified for an application. The evaluation result is fed back to an associated SDN controller to intelligently determine transmission paths and populate the flow table for the virtual router accordingly.

FIG. 1A is a functional block diagram depicting an exemplary configuration of a SDN virtual router 110 capable of attaining route performance data and providing the evaluation result to an SDN controller 120 in accordance with an embodiment of the present disclosure. In this simplified form, the virtue router 110 comprises a virtual switch 110, a route detection module 112, and a route performance evaluation module 113. The route detection module 112 may include an agent program. In this embodiment, the virtual router 110 acts as an abstract representation of two physical network devices 141 and 142. The network devices may be routers, switches, or any devices that are configured to act as routers or switches, such as servers, desktops, mobile computing devices, etc. The SDN controller 120 can intelligently manage data transmission for specific application programs and instruct the virtual router to take actions through flow table management 121.

For instance, prompted by a route discovery request sent from the virtual router 110 for forwarding a data packet, the SDN controller can preliminarily determine a few viable routes between the specified source node and destination node. The SDN controller can operate to create an evaluation task associated with specific evaluation criteria for these viable routes and assign the task to the virtual router 110. The route detection module 112 is configured to detect and gather performance data in response to the evaluation assignment. The performance data are processed and an evaluation result is generated at the route performance evaluation module 113 with reference to the evaluation criteria. The evaluation result is then communicated to the SDN controller 120 and used to select one or more optimal transmission routes from the viable routes and allocate data flow to the selected routes. The SDN updates the flow table with the selected routes as well as other related information. The virtual switch 111 then refers to the updated flow table to take actions with respect to incoming packets. As such, with the real-time route performance taken into account, data flow can be advantageously transmitted through the SDN in a highly efficient manner. In turn, the network performance can also be improved.

As will be appreciated by those skilled in the art, the present disclosure is not limited to any specific mechanism of attaining link performance data at virtual router. For example, the detection module 110 may be a simple agent program or a complex hierarchical system. An agent may be able to collect performance information specific to a network application and service. For example, microflow performance data related to particular application availability, utilization, and performance as well as performance characteristics of the underlying server can be selectively collected from network equipments, infrastructure, and actual servers. An agent may also be configured to gather macro-flow performance data related to aggregated network traffic based on individual connections, users, protocols or applications.

In some embodiments, upon receiving an evaluation task, the detection module 110 can send request messages over the selected routes to collect performance related data available at the virtual network elements or physical network elements along the selected routes. The performance data may include any data indicative of performances of individual links between every two nodes along the selected routes between the original node and a destination node. The performance data may also include the collective performance of a selected route between an original node and a destination node. The performance data may be generated in respective virtual routers along the selected routes. Further, it will be appreciated by those skilled in the art that based on the performance data with respect to the individual links and routes, the performance data between SDN controllers as well as performance data between a SDN controller and a virtual router can also be calculated. Accordingly, network maps can be updated based on the recently collected performance data and then used to determine an optimal route.

In some other embodiments, the detection module in the virtual router includes a packet generator capable of generating test packets and sending them over selected routes. Based on the route behavior responsive to the test packets, the detection module can derive performance information regarding the links between the network nodes along the routes, such as availability, throughput, bandwidth utilization, speed, stability, packet loss, round trip time (RTT), reliability, unreachable time, latency, error rates, CPU and memory utilization and associated latency.

In some embodiments, varying test packets can be generated based on the characteristics and performance of respective routes selected to transmit the test packets. In some embodiments, test packets have different lengths depending on the bandwidths of the routes to be evaluated.

Moreover, a packet generator can send out different sizes of packets to test a particular route or link, for example packets of 64 bytes, 128 bytes, and 512 bytes. Accordingly, latency data corresponding to each size of packet can be obtained respectively. Then the bandwidth usage and thus available bandwidth of the link or route can be derived by dividing the packet size by the latency time. As will be appreciated by those skilled in the art, a packet generator is implemented in any suitable method that is well known in the art.

The route performance evaluation module 120 analyzes the performance data collected by the detection module in accordance with any suitable model or algorithm, and evaluate the routes with reference to the evaluation criteria. The evaluation criteria is defined in terms of bandwidth, reachability, delay, cost, jitter, link usage, real time logs, throughput, error rate, stability, technology, modulation technique, enhancement measures, Mean Opinion Score (MOS), or any combination thereof.

A set of evaluation criteria may be generic or specific to an application program, e.g., 130. In some embodiments, only the performance data pertaining to the evaluation criteria are requested and gathered by the route detection module 110. For instance, for a video streaming program, low latency is desired and thus a maximum latency value is included in the evaluation criteria. Accordingly, the evaluation module 110 detects and collects any performance data that can contribute to the latency computation of a route.

Based on the performance evaluation results, the SDN controller 120 can intelligently select an optimized route for data transmission. Alternatively, the SDN controller can select multiple routes that meet the application requirements to transmit data simultaneously to improve network efficiency. In the latter situation, the SDN controller may intelligently allocate the data flow to the multiple routes depending on respective route performance. For example different workload is distributed to different routes in accordance with load balancing.

The present disclosure is not limited to any specific purpose to utilize the performance evaluation rendered by a virtual router in SDN. Provided with the performance evaluation, the SDN controller 120 may be configured to exercise control over network resource reservation as well as achieve service quality. For example, the SDN controller 120 can provide different priority to different applications, users, or data flows, or to guarantee a certain level of performance to a data flow.

In some embodiments, the SDN controller 120 can also incorporates network and application policies to select optimal transmission paths. The policies may be provided to the controller 120 in a form of policy table 132. In the illustrated example, the policy table is generated by a policy management component 131 in the application program 130. The policies may be any network constraints as well as settings and conditions, e.g., business constraints, economical constraints, security constraints, resource access constraints, and privacy constraints.

As will be appreciated by those skilled in the art, the virtual router 110 and the SDN controller 120 may include various other components and may be configured to perform any other functions that are well known in the art. The virtual router may be implemented as a software program in compliance with a Virtual Router Redundancy Protocol (VRRP). The host machine of the virtual router may be a computer, a server or any programmable network device.

Figure 1B:
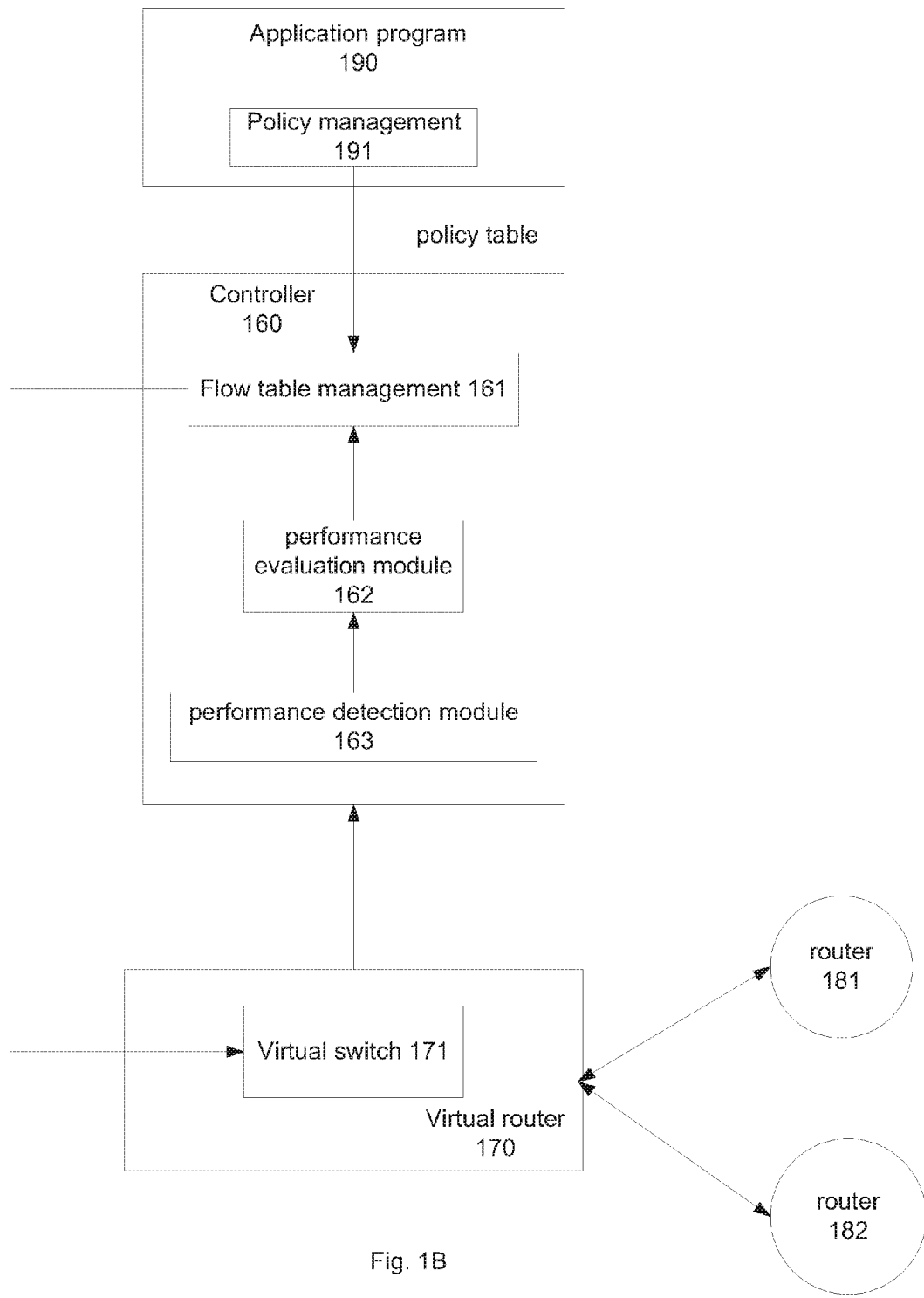
FIG. 1B is a functional block diagram depicting an exemplary configuration of a SDN controller capable of attaining route performance data and evaluating route performance in accordance with an embodiment of the present disclosure.

In some other embodiments, the performance detection and evaluation are performed at the SDN controller. FIG. 1B is a functional block diagram depicting an exemplary configuration of a SDN controller 160 capable of attaining route performance data and evaluating route performance in accordance with an embodiment of the present disclosure. In this example, a policy table can be generated by a policy management component 191 in the application program 190. The SDN controller 160 has a performance detection module 162 and performance evaluation module 163 that are similar with their counterparts 112 and 113 of FIG. 1A. In this example, the virtual router 170 mainly serves as a virtual switch 171 and an abstract representation of the two routers 181 and 182. In some embodiments, the performance detection module 162 can send test packets to selected routes to obtain the performance data and latency data of each links between nodes along the routes.

Figure 2:
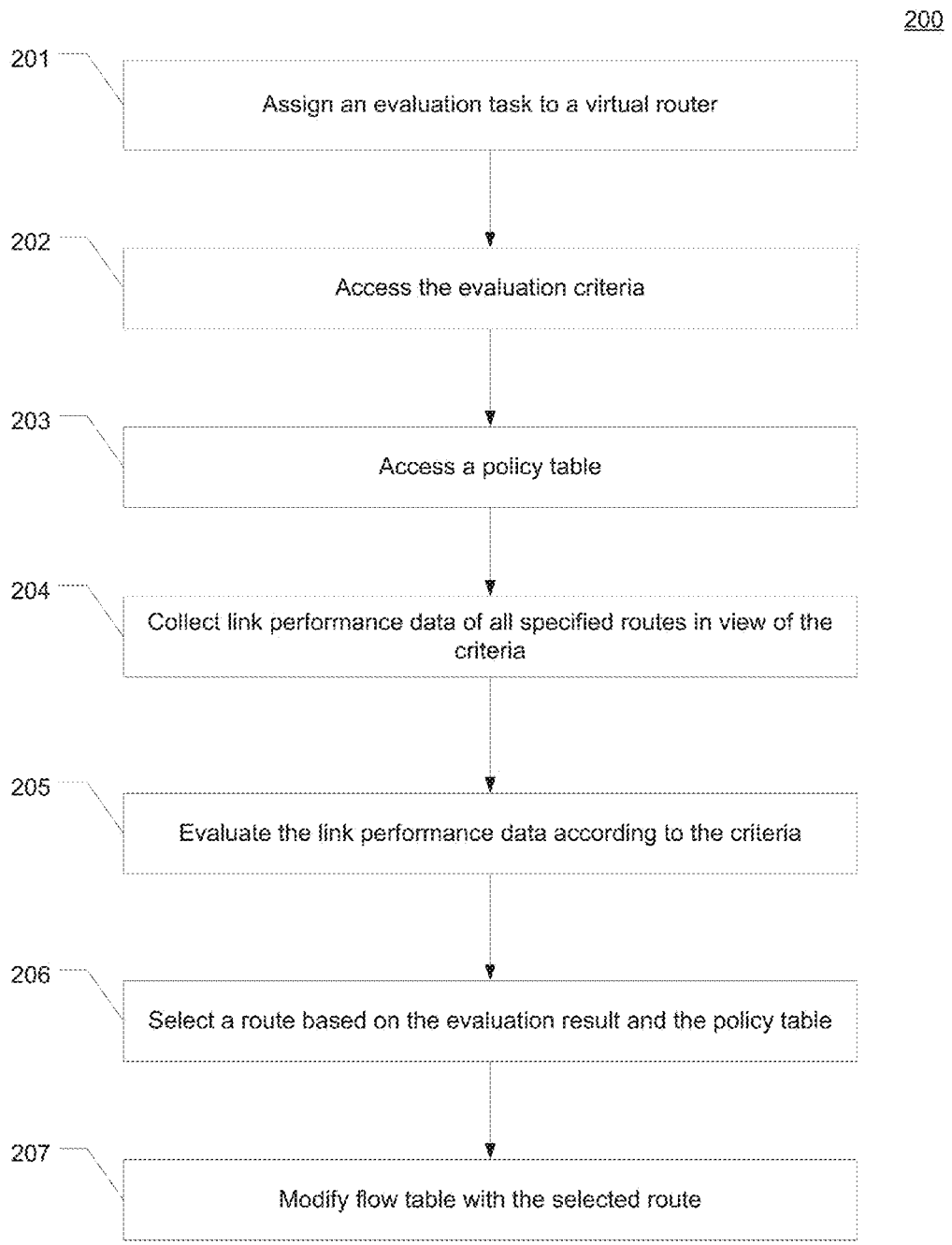
FIG. 2 is a flow chart depicting an exemplary computer implemented method of routing data based on link performance in an SDN according to an embodiment of the present disclosure.

FIG. 2 is a flow chart depicting an exemplary computer implemented method of routing data based on real-time link performance in an SDN according to an embodiment of the present disclosure. At 201, a link performance evaluation task is assigned to a performance detection module in a virtual router for a data packet. The task may specify one or more routes that are preliminarily identified by the SDN controller based on the desired destination IP address included in the data packet. A set of evaluation criteria as defined by an application program is accessed at 202 and communicated to the virtual router. At 203, a policy table corresponding to the application data is also accessed.

At 204, the virtual router collects the link performance data with respect to the evaluation criteria for all the routes specified in the evaluation task. At 205, the virtual router processes and analyzes the collected performance data based on the criteria and outputs an evaluation result to the SDN controller. At 206, the SDN controller may apply the policy constraints and select a route based on the evaluation result. At 207, the SDN controller modifies the flow table with new entries identifying the selected route for the data packet. The flow table is used by the virtual router to forward the subsequent data packet.

As will be appreciated by those skilled in the art, the present disclosure is not limited to any specific type of network comprising a SDN control mechanism, e.g., wireless local area network (WLAN), network, local area network (LAN), and wide area network (WAN), and etc. The SDN may be structured in accordance with any suitable SDN architecture model that is well known in the art, e.g., a centralized SDN model, a distributed SDN model, or a hybrid SDN model. In the centralized model, a centralized manager with a single controller can communicate with distributed data planes. In the distributed SDN model, a centralized manger interface can communicates with combined distributed controller and data planes. In a hybrid SDN model, a centralized manager communicates with separate distributed controller and data planes.

The SDN controller according to the present disclosure can implemented as a software program or hardware logic, or a combination of hardware and software in the control plane. The SDN controller may be a logically centralized entity but physically distributed among multiple hardware components in the network, or a logically distributed entity as shown in FIG. 3.

Figure 3:
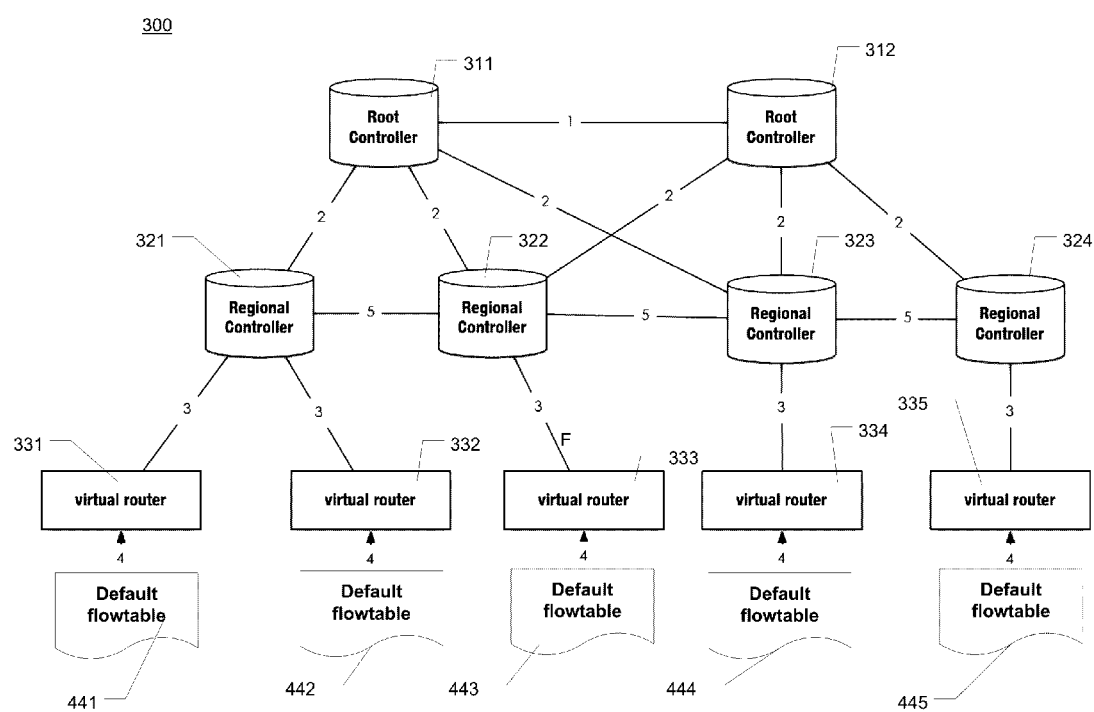
FIG. 3 is a block diagram illustrating an exemplary architecture of a distributed SDN control system configured to control data routing based on real-time link performance determined by virtual routers in accordance with an embodiment of the present disclosure.

FIG. 3 is a block diagram illustrating an exemplary architecture of a distributed SDN control system 300 configured to control data routing based on real-time link performance determined by virtual routers in accordance with an embodiment of the present disclosure. The control system 300 includes a plurality of root controllers on the top level, e.g., 311 and 332, and a plurality of regional controllers on the bottom level, e.g., 321-324. Each regional controller can control one or more virtual routers, e.g., 331-335.

As illustrated, each of the root controllers 311 and 332 maintains a global network map of the SDN, or a network map of a SDN subnetwork that the root controller manages. The SDN subnetwork corresponds to a domain of the SDN in some embodiments. As represented by the line with the label "1," the root controllers 311 and 332 in a distributed SDN control system are capable of communicating with each other and synchronizing with each other the information included in their respective global network maps, especially the route information outside their respective subnetwork.

As represented by lines with the label "2," the root controllers 311 and 332 are also capable of synchronizing the route information with the regional controllers 321-324. For example, the root controller can collect updated network information from the regional controllers and share relevant information from the global network map with the regional controllers. As represented by lines with the label "3," the regional controllers 321-324 can directly control the virtual routers, e.g., 331-335, and program corresponding flow tables for the virtual routers. In some embodiments, the regional controller 321-324 can communicate with the virtual routers in accordance with the OpenFlow protocol and standard.

The regional controllers 321-324 can also communicate with each other with respect to the performance of a respective network region, as determined by the associated virtual routers, as marked by lines "5." A regional controller can be employed to determine a route by use of the regional network map and modify the default flow table (e.g., 441, 442, 443, 444 or 445) accordingly, as discussed in detail above. Further, if the regional network map still lacks sufficient information to determine the requested route because the destination node is located in another region of the network, a root controller can be employed to determine a requested route by use of the global network map. Subsequently the corresponding regional controller can modify a default flow table (e.g., 441, 442, 443, 444 or 445) based on the route determined by the root controller.

Figure 4:
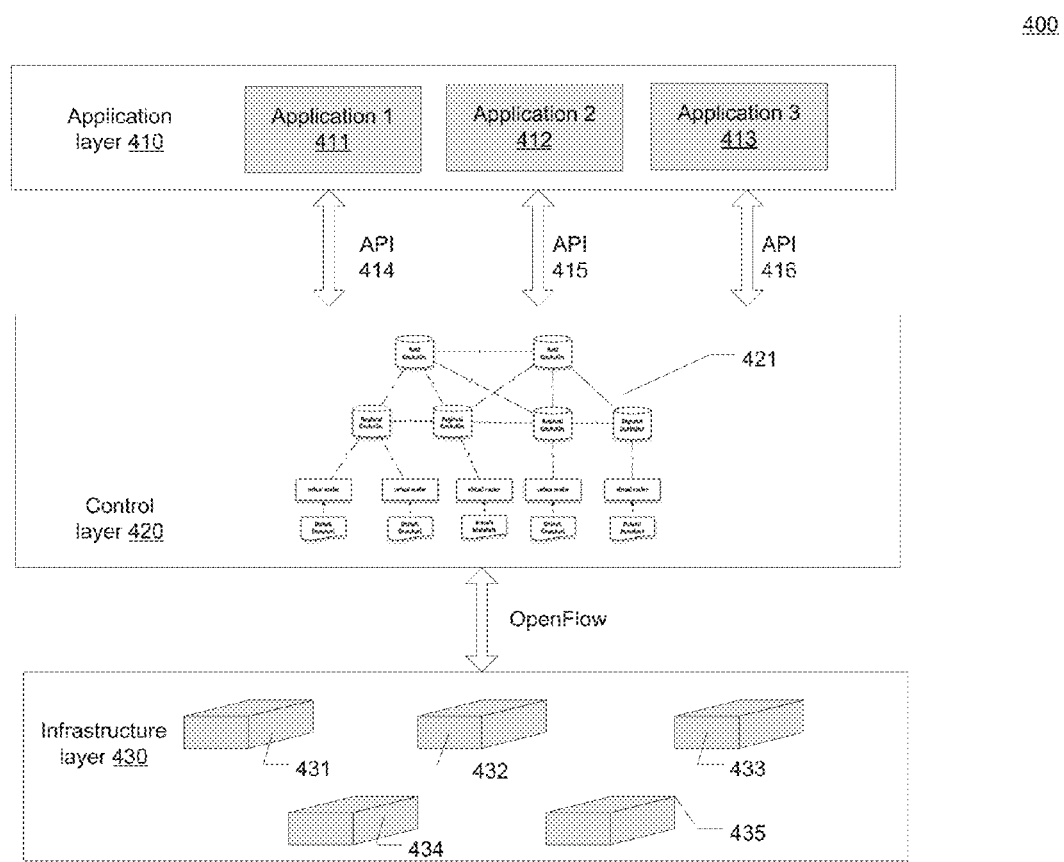
FIG. 4 is a block diagram illustrating an exemplary architecture of an SDN equipped with a distributed control system and configured to transmit data based on real-time link performance in accordance with an embodiment of the present disclosure.

FIG. 4 is a block diagram illustrating an exemplary architecture of an SDN 400 equipped with a distributed control system and which is configured to transmit data based on real-time link performance in accordance with an embodiment of the present disclosure. The SDN 400 includes three logic layers: the application layer 410, the control layer 420, and the infrastructure layer 430. The control layer 420 serves as the interface between the application layer 410 and the infrastructure layer 430 and intelligently manages network services based on real-time route performance information provided by virtual routers.

The infrastructure layer 430 includes the network hardware devices 431-435 coupled in the network, e.g., router and switches. The control layer 420, or the SDN controller, can offer proprietary programming interfaces to network devices and management functionalities. The control layer 420 includes one or more control software programs that implement a distributed control system 421 as discussed with reference to FIG. 3. The control layer 420 communicates with the network devices in the OpenFlow protocol.

The application layer 410 includes application programs 411-413 and can deliver network functions or services in software on a virtual machine or only create an overlay network. For example, the application programs 411-413 can be related to cloud, load balancing, business applications, network security, burst transmission, to name a few. The application layer 410 communicates with the control layer application program interfaces 414-416 corresponding to respective application programs 411-413.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of routing data in a software-defined network (SDN) through a virtual network element, said
    computer implemented method comprising:
    identifying a source node and a destination node in said SDN for transmitting packet data;
    identifying evaluation criteria;
    attaining performance data indicative of link performance between said source node and said destination node, wherein said attaining performance data comprises sending test packets over a plurality of transmission paths between said source and said destination node, wherein said test packets have varying lengths depending on bandwidths of said plurality of transmission paths, wherein sending the test packets comprises: sending a set of test packets with different lengths to a respective transmission path of said plurality of paths; obtaining respective latency times of said respective transmission path in response to said set of test packets; and deriving bandwidth usage of said respective transmission path based on said respective latency times;
    evaluating said performance data with reference to said evaluation criteria;
    sending an evaluation result to an SDN controller of said SDN; and
    receiving a flow table that is configured by said SDN controller based on said evaluation result.

2. The computer implemented method of claim 1, wherein said attaining performance data further comprises detecting performance data of said plurality of transmission paths, and wherein said plurality of transmission paths are determined by said SDN controller.

3. The computer implemented method of claim 2, wherein said evaluating comprises comparing said plurality of transmission paths, and further comprising:
    selecting a resultant path from said plurality of transmission paths based on said evaluation result, wherein, said flow table is configured based on said resultant path; and
    forwarding said packet data over said resultant path.

4. The computer implemented method of claim 3, wherein said flow table is further configured based on constraints defined by network policies and application policies, and wherein further said evaluation criteria are specific to said packet data.

5. The computer implemented method of claim 2 further comprising allocating and forwarding said packet data over said plurality of transmission paths in accordance with load balancing based on said evaluation result.

6. The computer implemented method of claim 1, wherein said evaluation criteria comprise parameters selected from a group consisting of reachability, speed, load, latency, packet loss, stability, unreachable time, round trip time, reliability, link usage, throughput, cost, jitter and Mean Opinion Score (MOS), and wherein further said constraints are selected from a group consisting of business constraints, economical constraints, security constraints, resource access constraints, and privacy constraints.

7. The computer implemented method of claim 1, wherein said virtual network element comprises a virtual router, and wherein further said SDN controller is configured to communicate said evaluation result to another SDN controller of said SDN.

8. A device configured to route packet data between network nodes in a software-defined network (SDN), said device comprising:
   a memory coupled with a processor and operable to store instructions executable by said processor;
   a network circuit coupled to said processor and enabling said device to access said SDN; and
   said processor configured to:
      identify a source node and a destination node in said SDN for transmitting packet data;
      identify evaluation criteria;
      send test packets over a plurality of transmission paths between said source node and said destination node to detect performance data indicative of link performance between said source node and said destination node, wherein said test packets have varying lengths depending on bandwidths of said plurality of transmission paths, wherein sending the test packets comprises: sending a set of test packets with different lengths to a respective transmission path of said plurality of paths; obtaining respective latency times of said respective transmission path in response to said set of test packets; and deriving bandwidth usage of said respective transmission path based on said respective latency times;
      evaluate said performance data with reference to said evaluation criteria;
      send an evaluation result to a SDN controller; and
      receive a flow table that is configured by said controller based on said evaluation result.

9. The device of claim 8, wherein processor is configured to detect performance data of said plurality of transmission paths between said source node and said destination node, and wherein said plurality of transmission paths are determined by said SDN controller.

10. The device of claim 9,
   wherein said evaluation criteria are specific to said packet data, and
   wherein said processor is further configured to:
      evaluate said performance data by comparing said plurality of transmission paths;
      select a resultant path from said plurality of transmission paths based on said evaluation result, wherein said flow table is configured based on said resultant path and based on constraints defined by network policies and application policies; and
      forward said packet data over said resultant path.

11. The device of claim 9, wherein said processor is further configured to allocate and forward said packet data over said plurality of transmission paths in accordance with load balancing based on said evaluation result.

12. The device of claim 8, wherein said evaluation criteria comprise parameters selected from a group consisting of speed, reliability, stability, unreachable time, package loss, round trip time (RTT), reachability, load, latency, less, link usage, throughput, cost, jitter and Mean Opinion Score (MOS), and wherein further said constraints are selected from business constraints, economical constraints, security constraints, resource access constraints, and privacy constraints.

13. A controller for providing network service management for a software-defined network (SDN), said controller coupled to virtual network elements and comprising:
   a processor;
   a network circuit coupled to said processor;
   memory coupled with said processor and storing instructions that, when executed by said processor, cause said processor to perform a method of:
   receiving a route discovery request for packet data from a virtual network element;
   determining a plurality of transmission paths for said packet data;
   providing evaluation criteria to said virtual network element;
   assigning a route evaluation task to said virtual network element, wherein said virtual network element is configured to:
   send test packets to said plurality of transmission paths to attain performance data indicative of link performance between a source node and a destination node in response to said route evaluation task, wherein said test packets have different lengths depending on bandwidths of said plurality of transmission paths, wherein sending the test packets comprises: sending a set of test packets with different lengths to a respective transmission path of said plurality of paths; obtaining respective latency times of said respective transmission path in response to said set of test packets; and deriving bandwidth usage of said respective transmission path based on said respective latency times;
   evaluate said performance data with reference to said evaluation criteria;
   send an evaluation result to said controller; and
   program a flow table based on said evaluation result.

14. The controller of claim 13, wherein said method further comprises:
   accessing route constraints with respect to said packet data; and
   selecting one or more resultant transmission paths from said plurality of transmission paths for based on said evaluation result and said route constraints, wherein said flow table is programmed with said one or more resultant transmission paths.

15. The controller of claim 13, wherein said SDN comprises a plurality of controllers including said controller, wherein each controller is configure to control a set of virtual network elements, wherein said method further comprises communicating said evaluation result to another controller.

16. The controller of claim 13, wherein said plurality of controllers are arranged into a hierarchy, and wherein further said plurality of controllers are configured to control network resource management and quality of service based on said evaluation result.

17. The controller of claim 13, wherein said virtual network element is selected from a group consisting of a virtual router, a virtual switch, and a gateway.

18. The controller of claim 13, wherein said virtual network element is further configured to generate said test packets.

* * * * *